United States Patent
Braudaway et al.

(10) Patent No.: US 7,062,067 B2
(45) Date of Patent: Jun. 13, 2006

(54) PROTECTING IMAGES WITH MULTIPLE IMAGE WATERMARKS

(75) Inventors: Gordon W. Braudaway, Yorktown Heights, NY (US); Frederick C. Mintzer, Shrub Oak, NY (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 10/171,042

(22) Filed: Jun. 12, 2002

(65) Prior Publication Data

US 2003/0128860 A1 Jul. 10, 2003

Related U.S. Application Data

(60) Provisional application No. 60/299,822, filed on Jun. 21, 2001.

(51) Int. Cl.
*G06K 9/00* (2006.01)
(52) U.S. Cl. .................................................. 382/100
(58) Field of Classification Search .................... None
See application file for complete search history.

(56) References Cited

U.S. PATENT DOCUMENTS 5,825,892 A * 10/1998 Braudaway et al. .......... 380/51
6,259,801 B1 * 7/2001 Wakasu ....................... 382/100
6,574,350 B1 * 6/2003 Rhoads et al. ............... 382/100
6,625,295 B1 * 9/2003 Wolfgang et al. ............ 382/100
6,826,289 B1 * 11/2004 Hashimoto ................... 382/100
2002/0090110 A1 * 7/2002 Braudaway et al. ......... 382/100
2003/0228031 A1 * 12/2003 Rhoads ........................ 382/100

* cited by examiner

*Primary Examiner*—Jingge Wu
*Assistant Examiner*—Ashutosh Upreti
(74) *Attorney, Agent, or Firm*—Louis P. Herzberg

(57) ABSTRACT

The present invention provides methods and apparatus for imparting a multiplicity of watermarks onto a digitized image. The image includes a plurality of pixels, wherein each of the pixels includes brightness data that represents one brightness value if the image is monochrome, or a plurality of brightness data values if the image has multiple colors. In one aspect it provides for imparting more than one watermark into the digitized image comprising the steps of providing the digitized image, and multiplying the brightness data associated with at least one of the image pixels by a plurality of predetermined brightness multiplying value. Another aspect of the present invention is to provide a method for generating a composite watermark and imparting on a plurality of copies of a digitized image a different composite watermark into each copy. Also provided is a method for detecting one or more of the watermarks in the composite.

50 Claims, 3 Drawing Sheets

PROTECTING IMAGES WITH MULTIPLE IMAGE WATERMARKS

PRIORITY

This application claims priority from Provisional application, having the same title and inventorship, assigned Ser. No. 60/299,822, filed, Jun. 21, 2001.

FIELD OF THE INVENTION

This application relates to the field of digital imaging. It is more specifically concerned with the insertion and detection of identifying marks on a work-piece.

BACKGROUND OF THE INVENTION

It is a constant endeavor to find improved techniques of placing visible or invisible identifying marks on an image. This is generally useful to establish ownership, origin and authenticity, and also to discourage those who might wish to purloin or misappropriate the work. Identifying marks are also useful to give evidence of unauthorized alteration or disclosure. All heretofore watermarking methods are concerned with imparting a single watermark. There are advantages in imparting a composite watermark of a multiplicity of watermarks and henceforth detecting one or more watermarks from the multiplicity.

Invisible marks are herein classified relative to the appearance of that mark to a human being with normal visual acuity. A mark on an image is classified as having an invisibility classification level of undetectable invisible if, when the image without the marking is displayed together with an image copy with the marking, the human being is equally likely to select either of these copies. An undetectable invisible mark is below or at the human being's just-noticeable difference. A mark on an image is classified as having an invisibility classification level of subliminally invisible if the mark is not distracting to the human being, although it is above the human being's just-noticeable difference. An image marking is classified as being marginally invisible if it does not cause the marked image to lose its usefulness or value because of the mark. An image marking is classified as being poorly invisible if the marking causes a reduction in the image's usefulness and/or value.

Presently, invisible markings of hard copy documents are used as a generally dependable method of establishing ownership and authenticity. These time-tested methods are also useful for marking a "soft copy" digitized image, also referred to herein as a digital image or image. A digital image is an abstraction of a physical image that has been scanned and stored in a computer's memory as rectangular arrays of numbers corresponding to that image's (one or more) color planes. Each array element corresponding to a very small area of the physical image is called a picture element, or pixel. The numeric value associated with each pixel for a monochrome image represents the magnitude of its average brightness on its single color (black and white) plane. For a color image, each pixel has values associated and representing the magnitudes or average brightness of its tristimulus color components representing its three color planes. Other image representations have more than three color components for each pixel. A different value is associated with each different one of the image's color planes.

Whenever reference is made herein to color planes, it is understood to include any number of color planes used by a particular image's digitizing technique to define the pixel's color characteristics. This includes the case when there is only a single plane defining a monochromatic image.

Generally, a digitized image is recognizable as an image to a viewer only when the individual pixels are displayed as dots of white or colored light on a display or as dots of black or colored inks or dyes on a hard copy. Pixels are normally spaced so closely as to be not resolvable by a human visual system. This results in the fusion of neighboring pixels by the human visual system into a representation of the original physical image. Image fusion by the human visual system makes invisible marking, or relatively invisible marking, of images possible. This property is fully exploited by the methods described here to both impart upon a digitized image an invisible watermark to a desired invisibility classification, and to subsequently demonstrate its existence. The imparting and demonstrated detection of a robust invisible marking on digital images, herein called invisible watermarking, are a primary aspect of the present invention.

PROPERTIES OF A ROBUST INVISIBLE WATERMARK

A proper invisible watermarking technique that imparts an invisible watermark upon a proprietary digitized image should satisfy several properties. The imparted watermark should appear to be invisible to any person having normal or corrected visual accommodation to a desired invisibility classification level. Clearly, the degree of marking is a dichotomy. A balance has to be struck between protecting the image from unauthorized uses and not having the watermark unpleasantly alter the appearance of the image. This generally means that a recognizable pattern should not appear in the marked image when the watermark is applied to a uniform color plane. This requirement discourages marking the image by varying the hue of its pixels, since the human visual system is significantly more sensitive to alterations in hue than in brightness. The requirement can be satisfied by a technique based on varying pixel brightness implemented in a proper way. A technique based on varying pixel brightness also allows the same marking technique applied to color images to be equally applicable to monochrome images.

Another property of a proper invisible watermarking technique is that it should have a detection scheme such that the probability of a false-positive detection, that is, the false detection of a mark when one, in fact, does not exist, is vanishingly small. For purposes of the present invention, the probability of detection of a watermark in an image when one does not exist should be less than one in a million. There is generally little difficulty satisfying this requirement when the technique is statistically based.

Still another property of a proper watermarking technique is that it should be possible to vary the degree of marking applied to an image. In this way, the watermark can be made as detectable as necessary by the particular application. This property is important in highly textured images where it is often necessary to increase the intensity of the mark to increase its likelihood of detection. This is in contradistinction with images that have low contrast in which it is advantageous to reduce the marking intensity to lessen undesirable visible artifacts of the watermark itself.

Finally, the imparted watermark should be robust in that it should be very difficult to be removed or rendered undetectable. It should survive such image manipulations that in themselves do not damage the image beyond usability. This includes, but is not limited to, JPEG "lossy" compression, image rotation, linear or nonlinear resizing, brightening, sharpening, "despeckling," pixel editing, and the superposition of a correlated or uncorrelated noise field upon the image. Attempts to defeat or remove the watermark should be generally more laborious and costly than purchasing rights to use the image. If the image is of rare value, it is desirable that the watermark be so difficult to remove that telltale traces of it can almost always be recovered. It is noted that various visible and invisible watermarking techniques are know to those skilled in the art. Each technique generally has different advantages and satisfying different levels of robustness, security and adaptability. Many of these employ particular algorithms in determining how the pixel date of pixels in the original unmarked digitized image is to be modified in order to include the particular watermark. In general, each watermark importing technique has a corresponding watermark detecting technique. The common feature of many of these techniques is that the pixel data is ultimately modified in a particular way.

It would be advantageous to have a watermarking technique which would enable imparting a multiplicity of watermarks one at a time, in groups, and/or a group of watermarks all at once. The totality of the multiplicity of watermarks are herein referred to a composite watermark. Each of the separate watermarks is a part of the composite watermark. It would also be advantageous to have a watermarking technique which would enable detecting the imparted multiplicity of watermarks one at a time, in groups, and/or a group of watermarks all at once.

SUMMARY OF THE INVENTION

It is therefore an aspect of the present invention to provide methods, systems and apparatus for imparting a multiplicity of watermarks into a digitized image including the steps of providing the digitized image, and multiplying the brightness data associated with at least one of the image pixels by a plurality of predetermined brightness multiplying values.

In another aspect of a general embodiment, the brightness values of all image pixels or all image pixels in a specified image portion, are multiplied by an associated brightness multiplying value.

In another particular embodiment, each of the pixels has a row and a column location in an array representing the digitized image, and each brightness multiplying value employs a different sequential combination of numbers from a different robust random number sequence in sequential correspondence to the row and column location.

Another aspect of the present invention is to provide a method for generating a composite watermarked image wherein watermarks are imparted into a digitized image having a plurality of original elements. Each of the elements having original brightness values.

Another aspect of the present invention is to provide a method for forming composite watermarking planes. Each watermarking plane in the composite including a plurality of elements with element having a multiplying value.

Another aspect of the present invention is to provide methods and apparatus which would enable detecting the imparted multiplicity of watermarks one at a time, in groups, and/or a group of watermarks all at once.

BRIEF DESCRIPTION OF THE DRAWINGS

These and other aspects, features, and advantages of the present invention will become apparent upon further consideration of the following detailed description of the invention when read in conjunction with the drawing figures, in which.

DETAILED DESCRIPTION OF THE INVENTION

Figure 1:
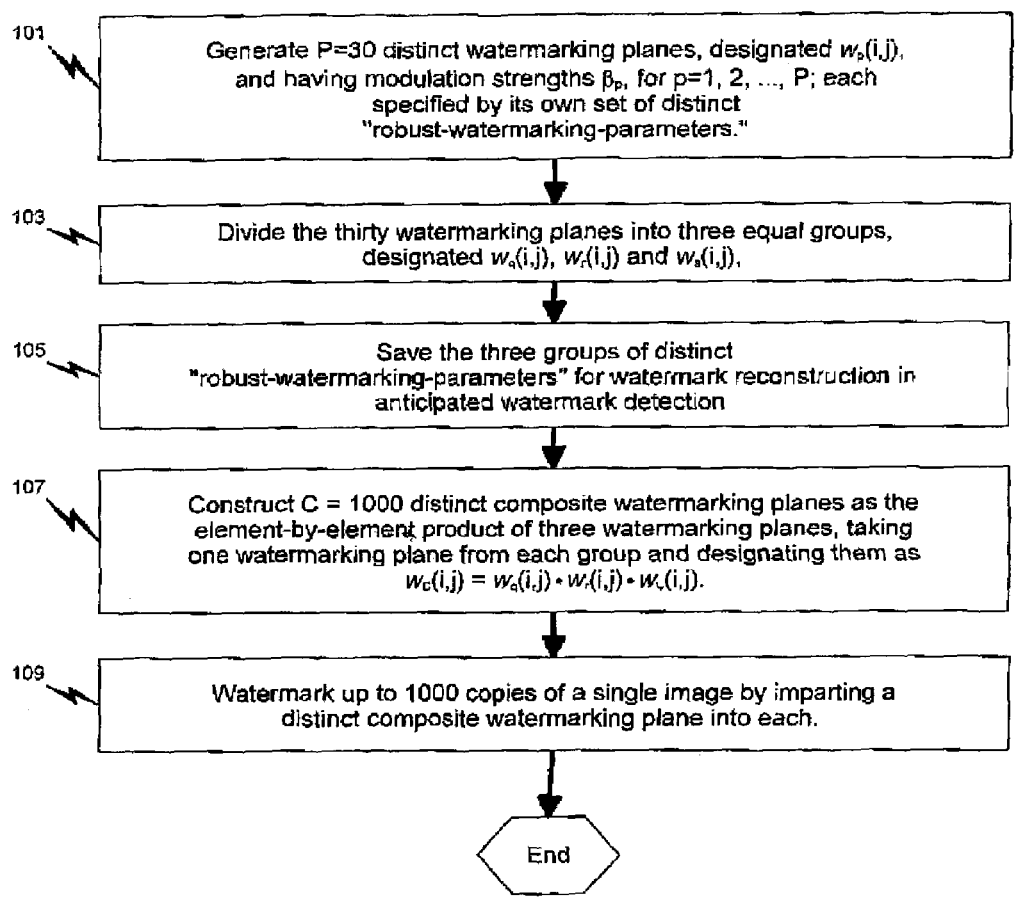
FIG. 1 shows a block diagram of an example of a method of generating multiple composite watermarking planes for imparting into multiple image copies in accordance with an embodiment of the present invention.

The present invention provides methods, systems and apparatus for imparting upon a digitized image a multiplicity of watermarks one at a time, in a group, in a plurality of groups, and/or a group of watermarks all at once. The totality of the multiplicity of watermarks are herein referred to a composite watermark. Each of the separate watermarks is a part of the composite watermark.

Generally, the image includes a plurality of pixels, wherein each of the pixels includes brightness data that represents one brightness value if the image is monochrome, or a plurality of brightness data values if the image has multiple colors.

In an exemplary embodiment, the present invention provides these methods, systems and apparatus for imparting the multiplicity of watermarks into a digitized image including the steps of providing the digitized image, and multiplying the brightness data associated with a plurality of the image pixels by a plurality of predetermined brightness multiplying values. A multiplying value is also called a factor or a multiplying factor. In a most general embodiment, the brightness values of all image pixels or all image pixels in a specified image portion, are multiplied by an associated brightness multiplying value.

The brightness multiplying values range from zero to unity. In an advantageous embodiment the brightness multiplying values range from 0.8 to 1.0. In a more particular embodiment, each of the several brightness multiplying values has a relationship with a number taken from a different random number sequence and the relationship is a linear remapping to provide a desired modulation strength. The modulation strength is generally between zero and unity. In some embodiments it is more than zero but less than 0.8.

In another particular embodiment, each of the pixels has a row and a column location in an array representing the digitized image, and each brightness multiplying value employs a different sequential combination of numbers from a different robust random number sequence in sequential correspondence to the row and column location.

The present invention is adaptable for use of any of many watermarking techniques. It is most particularly adaptable to a watermarking technique employing a watermarking plane. Thus, although the present invention is adaptable to many watermarking techniques, it is most easily described and adaptable to the watermark imparting and detecting methods described in U.S. Pat. Nos. 5,530,759 and 5,825,892 which are herein included by reference in entirety for all purposes. Methods and apparatus enable imparting and/or detecting the imparted multiplicity of watermarks one at a time, in groups, and/or a group of watermarks all at once.

In still another particular embodiment, the present invention provides methods and apparatus for forming composite watermarking planes. Each watermarking plane in the composite watermarking planes including a plurality of elements with each element having a multiplying value.

Specifically, in an exemplary embodiment, watermarks are imbedded into an image by multiplying the brightness of the components of each pixel of the image by the linearly remapped values of the watermarking plane, w(i,j), where $1 > w(i,j) \geq (1-2\beta)$, i is the value's row index, j is the value's column index, and $\beta$ is the modulation strength of the watermark. More than one watermark can be imparted into an image by sequential applications of the methods of this invention. Each watermark so imparted will be represented by a distinct watermarking plane generated using its own distinct "robust-watermarking-parameters." If the quantity P of watermarking planes, designated $w_P(i,j)$, each having a modulation strength $\beta_p$, for p=1, 2, . . . ,P, are sequentially imparted into an image, then each watermarking plane can be detected by knowing only its unique robust-watermarking-parameters.

Using the mathematical property of association, a single composite watermarking plane, $w_C(i,j)$, can be constructed that is the element-by-element product $$w_C(i,j) = w_1(i,j) \cdot w_2(i,j) \cdot \ldots \cdot w_P(i,j)$$

To a first order of approximation, the equivalent modulation strength of the composite watermarking plane is the sum of the modulation strengths of its parts, or $$\beta_C = \beta_1 + \beta_2 + \ldots + \beta_P$$

Applying several distinct watermarks to an image by using a composite watermarking plane is useful for many applications. For example, if thirty distinct watermarking planes are generated, each with its own distinct "robust-watermarking-parameters," and the thirty are divided into three equal groups in such a manner that each watermarking plane appears in only one group, then 1000 distinct composite watermarking planes can be produced by using one watermarking plane from each of the three groups. If the 1000 composite watermarking planes are used to watermark 1000 copies of an image, subsequent detection of the single composite mark requires no more than thirty detection attempts using each of the thirty distinct watermarking planes. Since each distinct watermarking plane of a composite watermarking is itself detectable, a particular composite watermarking plane is also identified by the detection of its three composite parts. Once the three composite parts are individually detected, a final detection of the particular composite watermarking may be attempted as further verification of the correct identification of the one of 1000 distinct composite watermarking planes. This is significantly more efficient than searching for the particular watermark by attempting detection of each of the 1000 composite watermarking panes until the correct one is found. On average, detection of a particular composite watermarking plane will require fifteen tries rather than 500, and a maximum of thirty tries rather than 1000.

Applying more than one distinct watermark to an image is also useful when the set of "robust-watermarking-parameters" of one watermark remain secret to a first entity while, for example, a second set is divulged to another entity. The divulged parameter set could be used by an image copy recipient, a second entity, to detect the second watermark, but the secret watermark remains undetectable except by the first entity having knowledge of the secret parameter set used to generate it.

As an example, referring to FIG. 1, thirty distinct watermarking planes are generated using the method of the present invention (101). Each of the thirty watermarking planes, designated as $w_P(i,j)$, p=1, 2, . . . , 30, is generated using its own distinct "robust-watermarking-parameters." In this manner and as stated before, each watermarking plane can be reconstructed at any future time if its distinct "robust-watermarking-parameters" are then known. The thirty distinct watermarking planes are arbitrarily divided into three equal groups (103) with none of the thirty appearing in more than one group. Members of the three groups are designated as $w_q(i,j)$, $w_r(i,j)$, and $w_s(i,j)$, respectively. Once divided, knowledge of the "robust-watermarking-parameters" corresponding to each group is retained (105), since reconstruction of the thirty watermarking planes from their "robust-watermarking-parameters" will be required for watermark detection at a later time. Using the three groups, 1000 distinct composite watermarking planes, designated $w_C(i,j)$, are formed as the element-by-element products of three distinct watermarking planes, one chosen from each of the three groups (107). The 1000 composite watermarking planes are the maximum number of distinct combinations of elements from the three groups. It is evident to those skilled in the art that 10,000 distinct composite watermarking planes could be formed in a similar manner from forty distinct watermarking planes separated into four equal groups.

The 1000 distinct composite watermarking planes can be used one at a time to impart a distinct watermark into 1000 copies of a single image (109), using the method described in U.S. Pat. No. 5,825,892, included herein in its entirety, or other method.

Figure 2:
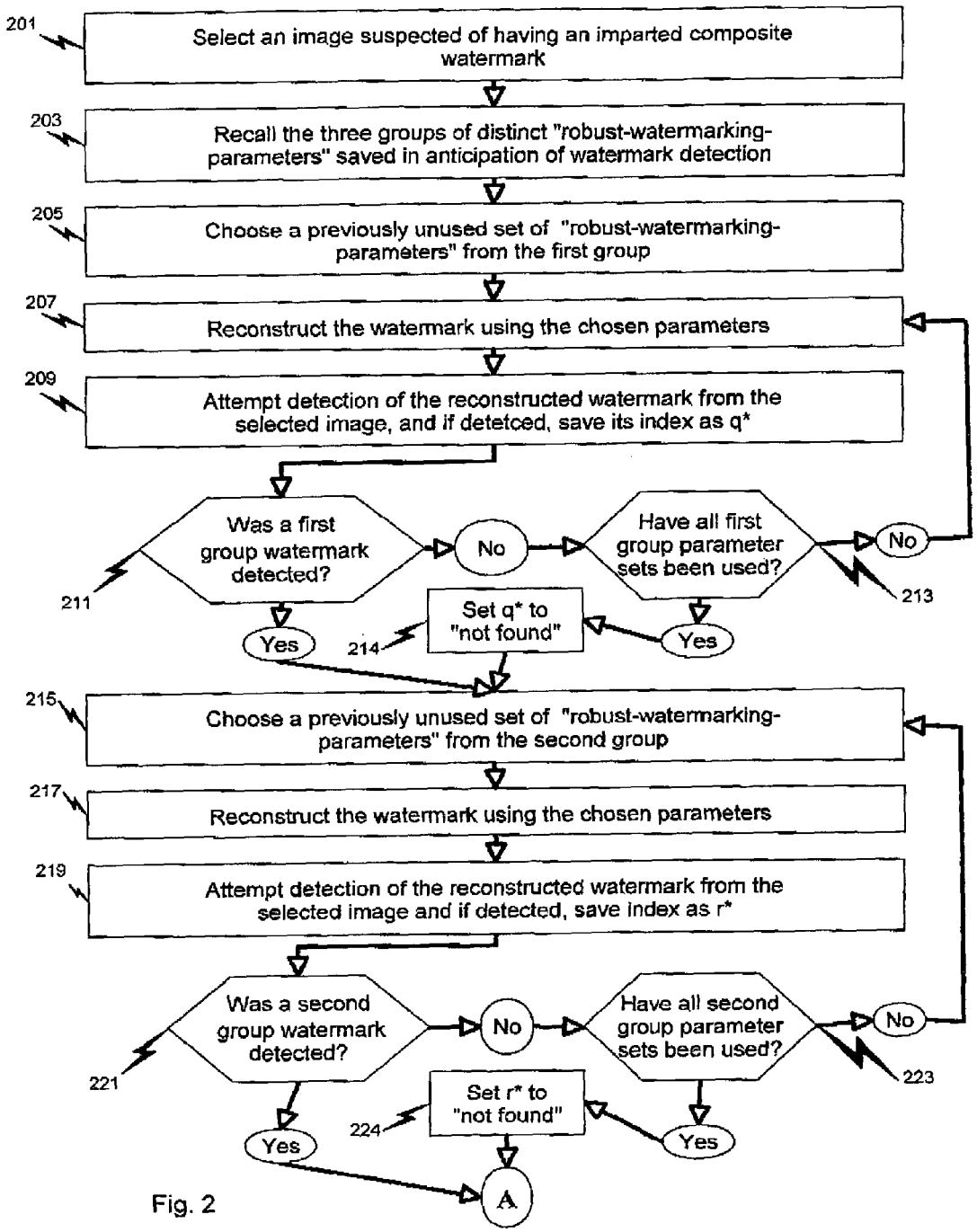
FIGS. 2(a) and 2(b) together show an example of a flow diagram for detecting a particular composite watermark from an image copy suspected of having an imparted watermark in accordance with the present invention.
Figure 2:
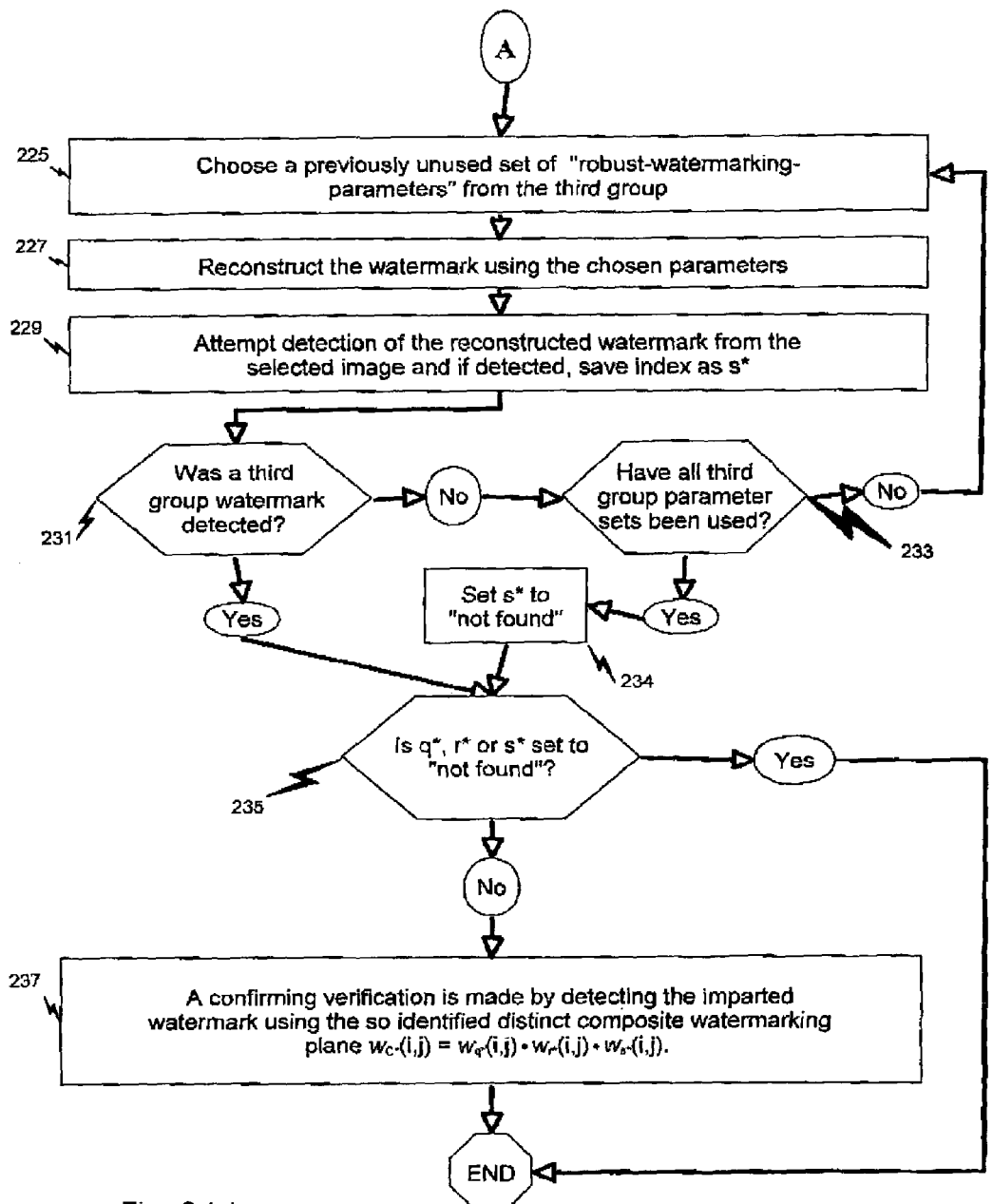

Referring to FIGS. 2a and 2b, wherein FIG. 2(b) is a continuation of FIG. 2(a), if it is desired to determine whether one of the 1000 composite watermarks was used to impart a watermark into an image copy that is suspected of being one of the 1000 so watermarked (201), knowledge of the three groups of "robust-watermarking-parameters" saved during the watermarking process is recalled (203). An applicable method used for watermark detection is described in U.S. Pat. No. 5,825,892, included herein by reference in its entirety. It is not necessary to attempt watermark detection with each of the 1000 composite watermarking planes until the correct one is found. Rather, the component parts of the composite watermarking plane, namely the three watermarking planes used in its construction, can be used individually instead. This limits the search to not more than thirty tries, each try using one of the watermarking planes from the three groups.

The process is begun by choosing a previously unused set of "robust-watermarking-parameters" from the first group of ten sets (205). A unique watermarking plane is reconstructed from the chosen set of parameters (207). Detection of the reconstructed watermarking plane in the selected image copy is attempted, and if the detection is successful, the index of the set, q*, of "robust-watermarking-parameters" from the first set that was used to regenerate the watermarking plane is saved (209). If the presence of the reconstructed watermarking plane in the image copy is detected (211), the process proceeds to (215); otherwise a test is made to determine if all ten of the first group sets of parameters have been used (213). If all ten have not been used, then steps (205) through (211) are repeated until either a detection is made (211) or all ten sets of parameters have been used (213). If no detection were made and all ten sets of parameters have been tried, q* is set to "not found" to reflect no detection (214).

The process is continued by choosing a previously unused set of "robust-watermarking-parameters" from the second group of ten sets (215). A unique watermarking plane is reconstructed from the chosen set of parameters (217). Detection of the reconstructed watermarking plane in the selected image copy is attempted, and if the detection is successful, the index of the set, r*, of "robust-watermarking-parameters" from the second set that was used to regenerate the watermarking plane is saved (219). If the presence of the reconstructed watermarking plane in the image copy is detected (221), the process proceeds to (225); otherwise a test is made to determine if all ten of the second group sets of parameters have been used (223). If all ten have not been used, then steps (215) through (221) are repeated until either a detection is made (221) or all ten sets of parameters have been used (223). If no detection were made and all ten sets of parameters have been tried, r* is set to "not found" to reflect no detection (224).

The process is further continued by choosing a previously unused set of "robust-watermarking-parameters" from the third group of ten sets (225). A unique watermarking plane is reconstructed from the chosen set of parameters (227). Detection of the reconstructed watermarking plane in the selected image copy is attempted, and if the detection is successful, the index of the set, s*, of "robust-watermarking-parameters" from the third set that was used to regenerate the watermarking plane is saved (229). If the presence of the reconstructed watermarking plane in the image copy is detected (231), the process proceeds to (235); otherwise a test is made to determine if all ten of the third group sets of parameters have been used (233). If all ten have not been used, then steps (225) through (231) are repeated until either a detection is made (231) or all ten sets of parameters have been used (233). If no detection were made and all ten sets of parameters have been tried, s* is set to "not found" to reflect no detection (234).

If the suspect image copy is in fact watermarked, on average, only five choices from each group of sets will be needed for a total of fifteen attempted detections, and not more than thirty detections will ever be needed. The indexes of the detected watermark from each of the three groups are designated q*, r* and s*, and the three detected watermarking planes as $w_{q*}(i,j)$, $w_{r*}(i,j)$, and $w_{s*}(i,j)$. The distinct composite watermarking is determined by knowing q*, r* and s*, and is $w_{C*}(i,j)=w_{q*}(i,j) \cdot w_{r*}(i,j) \cdot w_{s*}(i,j)$. If q*, r* and s* exist, that is, if none of them is set to "not found" (235), a further confirming verification can be done by detecting the composite watermarking plane $w_{C*}(i,j)$ (237), but, strictly speaking, it is not necessary. There can be only one composite watermarking plane composed of the detected constituent parts designated by $w_{q*}(i,j)$, $w_{r*}(i,j)$, and $w_{s*}(i,j)$.

Those skilled in the art will recognize that there are detection strategies using the component parts of a composite watermark other than the strategy shown in the present example. These other strategies are within the scope and intent of the present invention.

In the present example, detection of only one of three distinct imparted watermarks is strong evidence of knowledge of its set of watermarking parameters, but 100 of the 1000 images copies would have that imparted watermark and isolation to a single copy is not possible by this means. Detection of only two of the three distinct imparted watermarks is strong evidence of knowledge of the two sets of watermarking parameters, but ten of the 1000 image copies would have those imparted watermarks and isolation to the single copy is not possible by this means. Detection of all three distinct imparted watermarks is strong evidence of knowledge of all three sets of watermarking parameters, and isolation to the distinct image copy from the 1000 watermarked image copies is achieved. Detection of three distinct imparted watermarks, one from each group, is logically equivalent to detecting the single composite watermark that is constructed using those three distinct watermarks as its component parts.

It is noted that the composite watermark imparting and detection technique of the present invention is usable with other watermark imparting and detection techniques by sequentially applying the logical equivalents of their watermarking planes, whether those equivalents lie in the spatial pixel domain or in a transform domain (for example, a Discrete Fourier transform domain or a Discrete Cosine transform domain). A watermark may be factored into its associative component equivalent watermarking planes or made to be an associative composite combination on two or more of its component equivalent watermarking planes An alternative method for imparting a single watermark or a plurality of watermarks into a digital image is accomplished by first defining an auxiliary monochrome image plane. The size of the monochrome image plane is chosen such that pixels in the monochrome image plane have a one-to-one pixel correspondence with pixels of the digital image. The brightness values of pixels of the monochrome plane are chosen initially to be uniform in value and greater than zero. At least one watermark is imparted into the monochrome image plane forming a first watermarking image. A plurality of watermarks are accomplished by sequentially imparting at least one other watermark into the monochrome image plane forming another watermarking image. The brightness pixel values of said another watermarking image are linearly remapped such that all brightness values $v(i,j)$ lie in a range $1 > v(i,j) \geq (1-2\beta_C)$, where i is the value's row index, j is the value's column index, and $\beta_C$ is the cumulative modulation strength of the plurality of watermarks. It will be apparent to those skilled in the art that $v(i,j)$ is equivalent in form, meaning, and properties to the composite watermarking plane, $w_C(i,j)$, described previously, and $v(i,j)$ can therefore serve as an alternative form of a composite watermarking plane. It will also be apparent to those skilled in the art that the any image watermarking method can be used to impart watermarks sequentially into the auxiliary monochrome image plane that is subsequently used to form the linearly remapped values $v(i,j)$.

Thus, the present invention provides methods and apparatus wherein the first brightness multiplying value imparts a watermark of a first entity and at least one of said at least one subsequent brightness multiplying value imparts a watermark from one or more other entity; and/or wherein said element brightness multiplying value of said watermarking plane has a relationship with a number taken from a random number sequence; and/or wherein said relationship is a linear remapping to provide a desired modulation strength; and/or wherein said modulation strength is greater than 0 and less than 0.5; and/or wherein each of said pixels has a row and a column location in an array representing said digitized image, and wherein said element of said watermarking plane brightness multiplying value employs a different sequential combination of numbers from said random number sequence in sequential correspondence to said row and column location; and/or wherein said sequence is formed from a plurality of robust watermarking parameters; and/or wherein said parameters comprise a cryptographic key, at least two coefficients and an initial value of said random number generator; and/or wherein at least one distinct watermark is a visible watermark; and/or further comprising forming an element of a composite watermarking plane as the product of a first watermarking element chosen from a distinct watermarking plane from a single group of distinct watermarking planes, with at least one other watermarking element chosen from at least one other distinct watermarking plane chosen from the same group; and/or wherein a cluster of up to one million unique composite watermarking planes is formed by using distinct combinations of: a first distinct watermark plane taken from a first group of one hundred distinct watermarking planes; a second distinct watermarking plane taken from a second group of one hundred distinct watermarking planes; and a third distinct watermarking plane taken from a third group of one hundred distinct watermarking planes.

Furthermore, a cluster of unique composite watermarks can be formed from a single group of distinct watermarks by using all possible combinations of the distinct watermarks two at a time, three at a time, or m at a time. For example, if the single group of distinct watermarks is composed of thirty distinct watermarks, a cluster of 4060 unique composite watermarks can be formed using all possible combinations of the thirty distinct watermarks taken three at a time. Detection of a particular composite watermarking plane will require a maximum of thirty tries rather than 4060.

Furthermore, the present invention provides methods and apparatus for detecting a composite watermark imparted into a digitized image copy employing a watermarking process, including the steps of: recalling three groups of "robust-watermarking-parameters" saved during the watermarking process; choosing a previously unused set of "robust-watermarking-parameters" from a first group of ten sets; reconstructing a first distinct watermarking plane using the chosen set of "robust-watermarking-parameters" from the first group of ten sets; attempting detection of the reconstructed first distinct watermarking plane in the selected image copy; saving an index of the set, q*, of "robust-watermarking-parameters" from the first set that was used to regenerate the first distinct watermarking plane, $w_{q*}(i,j)$, if the detection is successful, otherwise repeating the steps of choosing, reconstructing and attempting until all ten sets of "robust-watermarking-parameters" from the first group of ten sets are used, otherwise setting q* to "not found" to reflect no detection if the detection using any set of "robust-watermarking-parameters" from the first group is not successful; choosing a previously unused set of "robust-watermarking-parameters" from a second group of ten sets; reconstructing a second distinct watermarking plane, $w_{r*}(i,j)$, using the chosen set of "robust-watermarking-parameters" from the second group of ten sets; attempting detection of the reconstructed second distinct watermarking plane in the selected image copy; saving an index of the set, r*, of "robust-watermarking-parameters" from the second set that was used to regenerate the second distinct watermarking plane if the detection is successful, otherwise repeating the steps of choosing, reconstructing and attempting until all ten sets of "robust-watermarking-parameters" from the second group of ten sets are used, otherwise setting r* to "not found" to reflect no detection if the detection using any set of "robust-watermarking-parameters" from the second group is not successful; choosing a previously unused set of "robust-watermarking-parameters" from a third group of ten sets; reconstructing a third distinct watermarking plane, $w_{s*}(i,j)$, using the chosen set of "robust-watermarking-parameters" from the third group of ten sets; attempting detection of the reconstructed third distinct watermarking plane in the selected image copy; and saving an index of the set, s*, of "robust-watermarking-parameters" from the third set that was used to regenerate the third distinct watermarking plane if the detection is successful, otherwise repeating the steps of choosing, reconstructing and attempting until all ten sets of "robust-watermarking-parameters" from the third group of ten sets are used, otherwise setting s* to "not found" to reflect no detection if the detection using any set of "robust-watermarking-parameters" from the third group is not successful.

In some embodiments, the detection further includes calculating composite watermarking elements, $w_{C*}(i,j)$, from the successful q*, r* and s* as $w_{q*}(i,j) \cdot w_{r*}(i,j) \cdot w_{s*}(i,j)$, while using $w_{q*}(i,j)=1$ for q* set to "not found", $w_{r*}(i,j)=1$ for r* set to "not found", and $w_{s*}(i,j)=1$ for s* set to "not found" for all i and j, to obtain a calculated reconstructed watermarking plane for in ranging from 1 to I, and j ranging from 1 to J; and/or confirming an existence of the calculated composite watermarking plane in the image by successfully detecting the calculated reconstructed watermarking plane.

In further embodiments, for detecting a composite watermark imparted into a digitized image copy employing a watermarking process, the method includes the steps of: recalling M groups of "robust-watermarking-parameters" saved during the watermarking process, each group having N sets of unique elements; designating the groups as group (m), with $1 \leq m \leq M$, and the sets of elements in group(m) as E(m,n) with $1 \leq n \leq N$; selecting a group(m) not previously selected from among the said M groups; choosing a previously unused set of "robust-watermarking-parameters", E(m,n), from the selected group(m); reconstructing an $m^{th}$ distinct watermarking plane, $w_{q(m)*}(i,j)$, using the chosen previously unused set of "robust-watermarking-parameters", E(m,n), from the selected group(m); attempting detection of the reconstructed $m^{th}$ distinct watermarking plane in the selected image copy; saving an index of the set, q(m)*, of "robust-watermarking-parameters" from the set E(m,n) that was used to regenerate the distinct watermarking plane, $w_{q(m)*}(i,j)$, if the detection is successful, otherwise repeating the steps of choosing, reconstructing and attempting until all N sets of "robust-watermarking-parameters" from the selected group(m) are used, otherwise if the detection is not successful setting q(m)* to "not found" to reflect no detection being made using any set of "robust-watermarking-parameters" from the selected group(m); and repeating the steps of selecting, choosing, reconstructing, attempting and saving until all M groups have not used.

In some embodiments, the detection further includes calculating composite watermarking elements, $w_{C*}(i,j)$, from the successful $$q(1)^*, q(2)^*, \ldots, \text{and } q(M)^*$$

as $$w_{q(1)*}(i,j) \cdot w_{q(2)*}(i,j) \cdot \ldots \cdot w_{q(M)*}(i,j),$$

while using $$w_{q(m)*}(i,j)=1 \text{ for all i and j}$$

for any q(m) set to "not found", to obtain a calculated reconstructed watermarking plane for i ranging from 1 to I, and j ranging from 1 to J; and/or confirming an existence of the calculated composite watermarking plane in the image by successfully detecting the calculated reconstructed watermarking plane; and/or wherein at least one watermark is subliminally invisible.

Furthermore, the present invention provides an article of manufacture comprising a computer usable medium having computer readable program code means embodied therein for causing watermarking, the computer readable program code means in said article of manufacture comprising computer readable program code means for causing a computer to effect the steps of a method of this invention.

Furthermore, the present invention provides a computer program product comprising a computer usable medium having computer readable program code means embodied therein for causing watermarking, the computer readable program code means in said computer program product comprising computer readable program code means for causing a computer to effect the steps of a method of this invention.

Still further, the present invention provides a program storage device readable by machine, tangibly embodying a program of instructions executable by the machine to perform method steps for watermarking, said method steps comprising the steps of a method of this invention.

The present invention also provides methods and apparatus for imparting a plurality of watermarks onto a digital image including the steps of: imparting a first watermark onto a monochrome plane, said monochrome plane having pixels with one-to-one pixel correspondence with pixels of said digital image and with said pixels of said monochrome plane initially having uniform pixel brightness values, said pixels of said monochrome plane forming a first watermarking image; imparting at least one other watermark upon said first watermarking image forming another watermarking image; linearly remapping pixel brightness values of said another watermarking image such that all brightness values 'bv' lie in a range $0 \leq bv \leq 1$, forming a composite watermarking plane; and imparting said plurality of watermarks from said composite watermarking plane into said digital image.

In some embodiments, the step of imparting said plurality of watermarks includes watermarks obtained by multiplying pixel brightness value of each pixel in said digital image by a linearly remapped brightness value of a corresponding pixel in said watermarking plane.

The present invention also provides methods and apparatus for obtaining a monochrome plane having monochrome pixels with one-to-one correspondence with image pixels of a digital image, said monochrome pixels having uniform brightness values; imparting a first watermark onto said monochrome plane in forming a first watermarked plane; imparting at least one other watermark onto said first watermarked plane in forming another watermarked plane; and linearly remapping the brightness values of said monochrome pixels such that all brightness values 'bv' lie in a range $0 \leq bv \leq 1$; and forming a composite watermarking plane.

Some embodiments include imparting the composite watermarking plane onto a digital image, said digital image having a plurality of image pixels, each image pixel having one-to-one corresponding with a monochrome pixel of said composite watermarking plane.

Some embodiments include detecting at least one distinct watermark from a composite watermark imparted into a digitized image: obtaining said digitized image into which said composite watermarked was imparted employing a particular watermarking process; and employing detection steps associated with a detection technique for a watermark imparted using said particular watermarking process.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent aspects and embodiments of the present invention. This invention may be used for many applications. Thus, although the description is made for particular arrangements and methods, the intent and concept of the invention is suitable and applicable to other arrangements and applications. For example, although reference is made to an example having 1000 copies of an image, the methods are applicable to any small or large number of image copies. Each copy, or group of copies having a particular composite watermark. Furthermore, a composite watermark is in some cases only actually and/or identifiably a single watermark. Similarly, although particular embodiments advantageously refer to all distinct watermarking elements in all distinct watermarking planes, other embodiments employ the concepts of this invention often using significantly less than all elements and/or less than all watermarking planes. Also, the technique is useful for applying distinct marks to a multiplicity of other than digitized images.

Thus, it will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method comprising imparting a plurality of watermarks into a digitized image, including the steps of:

providing the digitized image having at least one image plane, each said image plane being represented by an image array having brightness data for a plurality of pixels, each of said pixels having at least one color component and having a pixel position;

representing each watermark from the plurality of watermarks as being a distinct watermarking plane represented by an array having a plurality of distinct watermarking elements, each of said distinct watermarking elements having an array position, said array position having one-to-one array position correspondence with said pixel position of a particular pixel of said image pixels, and multiplying said brightness data associated with each said at least one color component by a corresponding distinct watermarking element from a subsequent distinct watermarking plane to produce a composite watermarked pixel.

2. A method as recited in claim 1, wherein all of said distinct watermarking elements in each of said distinct watermarking planes are greater than 0.5 and less than 1 for each of said pixels.

3. A method as recited in claim 1, further comprising employing a predetermined brightness multiplying value being a composite brightness multiplying value formed by combining a first brightness multiplying value and at least one subsequent brightness multiplying value.

4. A method as recited in claim 1, wherein at least one distinct watermarking plane is itself a composite watermarking plane, wherein said composite watermarking plane is represented by an array having a plurality of composite watermarking elements, each of said composite watermarking elements having a composite array position and having one-to-one composite array position correspondence with said pixel position of said particular pixel of said image pixels.

5. A method as recited in claim 4, further comprising forming each composite watermarking element as the product of a first distinct watermarking element from a first distinct watermarking plane and at least one other distinct watermarking element from at least one other distinct watermarking plane.

6. A method as recited in claim 1, further comprising constructing a first distinct watermarking plane using a first unique set of robust watermarking parameters, and constructing at least one other distinct watermarking plane using at least one other unique set of robust watermarking parameters.

7. A method as recited in claim 1, further comprising:
gathering at least one distinct watermarking plane into a first group,
gathering at least one other distinct watermarking plane into at least one other group, and
forming an element of a composite watermarking plane as the product of a first watermarking element chosen from a distinct watermarking plane from the first group with at least one other watermarking element chosen from at least one other distinct watermarking plane chosen from said at least one other group.

8. A method as recited in claim 7, wherein the number of distinct watermarking planes in the first group is ten and the number of distinct watermarking planes in each of said at least one other group is also ten, and wherein the number of groups is three.

9. A method as recited in claim 4, wherein a cluster of 1000 unique composite watermarking planes is formed by using:
all possible combinations of one distinct watermark plane taken from a first group of ten distinct watermarking planes;
a second distinct watermarking plane taken from a second group of ten distinct watermarking planes; and
a third distinct watermarking plane taken from a third group of ten distinct watermarking planes.

10. A method as recited in claim 1, wherein each of 1000 copies of the digitized image has imparted into it a unique composite watermark by using a particular one of 1000 unique composite watermarking planes from a cluster of 1000 composite watermarking planes.

11. A method as recited in claim 2, wherein the first brightness multiplying value imparts a watermark of a first entity and at least one of said at least one subsequent brightness multiplying value imparts a watermark from at least one other entity.

12. A method as recited in claim 1, wherein said element brightness multiplying value of said watermarking plane has a relationship with a number taken from a random number sequence.

13. A method as recited in claim 12, wherein said relationship is a linear remapping to provide a desired modulation strength.

14. A method as recited in claim 13, wherein said modulation strength is greater than 0 and less than 0.5.

15. A method as recited in claim 12, wherein each of said pixels has a row and a column location in an array representing said digitized image, and wherein said element of said watermarking plane brightness multiplying value employs a different sequential combination of numbers from said random number sequence in sequential correspondence to said row and column location.

16. A method as recited in claim 12, wherein said sequence is formed from a plurality of robust watermarking parameters.

17. A method as recited in claim 16, wherein said parameters comprise a cryptographic key, at least two coefficients and an initial value of said random number generator.

18. A method as recited in claim 1, wherein at least one distinct watermark is a visible watermark.

19. A method comprising detecting a composite watermark imparted into a digitized image copy employing a watermarking process, including the steps of:
recalling three groups of "robust-watermarking-parameters" saved during the watermarking process;
choosing a previously unused set of "robust-watermarking-parameters" from a first group of ten sets;
reconstructing a first distinct watermarking plane using the chosen set of "robust-watermarking-parameters" from the first group of ten sets;
attempting detection of the reconstructed first distinct watermarking plane in the selected image copy;
saving an index of the set, $q^*$, of "robust-watermarking-parameters" from the first set that was used to regenerate the first distinct watermarking plane, $w_{q^*}(i,j)$, if the detection is successful, otherwise repeating the steps of choosing, reconstructing and attempting until all ten sets of "robust-watermarking-parameters" from the first group of ten sets are used, otherwise setting $q^*$ to "not found" to reflect no detection if the detection using any set of "robust-watermarking-parameters" from the first group is not successful;
choosing a previously unused set of "robust-watermarking-parameters" from a second group of ten sets;
reconstructing a second distinct watermarking plane, $w_{r^*}(ij)$, using the chosen set of "robust-watermarking-parameters" from the second group of ten sets;
attempting detection of the reconstructed second distinct watermarking plane in the selected image copy;
saving an index of the set, $r^*$, of "robust-watermarking-parameters" from the second set that was used to regenerate the second distinct watermarking plane if the detection is successful, otherwise repeating the steps of choosing, reconstructing and attempting until all ten sets of "robust-watermarking-parameters" from the second group of ten sets are used, otherwise setting $r^*$ to "not found" to reflect no detection if the detection using any set of "robust-watermarking-parameters" from the second group is not successful;
choosing a previously unused set of "robust-watermarking-parameters" from a third group of ten sets;

reconstructing a third distinct watermarking plane, $w_{s*}(i,j)$, using the chosen set of "robust-watermarking-parameters" from the third group of ten sets;

attempting detection of the reconstructed third distinct watermarking plane in the selected image copy; and saving an index of the set, s*, of "robust-watermarking-parameters" from the third set that was used to regenerate the third distinct watermarking plane if the detection is successful, otherwise repeating the steps of choosing, reconstructing and attempting until all ten sets of "robust-watermarking-parameters" from the third group of ten sets are used, otherwise setting s* to "not found" to reflect no detection if the detection using any set of "robust-watermarking-parameters" from the third group is not successful.

20. A method as recited in claim 19, further comprising:

calculating composite watermarking elements, $w_{C*}(i,j)$, from the successful q*, r* and s* as $w_{q*}(i,j) \cdot w_{r*}(i,j) \cdot w_{s*}(i,j)$, while using $w_{q*}(i,j)=1$ for q* set to "not found", $w_{r*}(i,j)=1$ for r* set to "not found", and $w_{s*}(i,j)=1$ for s* set to "not found" for all i and j, to obtain a calculated reconstructed watermarking plane for i ranging from 1 to I, and j ranging from 1 to J.

21. A method as recited in claim 19, further comprising confirming an existence of the calculated composite watermarking plane in the image by successfully detecting the calculated reconstructed watermarking plane.

22. A method for detecting a composite watermark imparted into a digitized image copy employing a watermarking process, the method comprising the steps of:

recalling M groups of "robust-watermarking-parameters" saved during the watermarking process, each group having N sets of unique elements;

designating the groups as group(m), with $1 \leq m \leq M$, and the sets of elements in group(m) as E(m,n) with $1 \leq n \leq N$;

selecting a group(m) not previously selected from among the said M groups;

choosing a previously unused set of "robust-watermarking-parameters", E(m,n), from the selected group(m);

reconstructing an $m^{th}$ distinct watermarking plane, $w_{q(m)*}(i,j)$, using the chosen previously unused set of "robust-watermarking-parameters", E(m,n), from the selected group(m);

attempting detection of the reconstructed $m^{th}$ distinct watermarking plane in the selected image copy;

saving an index of the set, q(m)*, of "robust-watermarking-parameters" from the set E(m,n) that was used to regenerate the distinct watermarking plane, $w_{q(m)*}(i,j)$, if the detection is successful, otherwise repeating the steps of choosing, reconstructing and attempting until all N sets of "robust-watermarking-parameters" from the selected group(m) are used, otherwise if the detection is not successful setting q(m)* to "not found" to reflect no detection being made using any set of "robust-watermarking-parameters" from the selected group(m); and repeating the steps of selecting, choosing, reconstructing, attempting and saving until all M groups have not used.

23. A method as recited in claim 22, further comprising:

calculating composite watermarking elements, $w_{C*}(i,j)$, from the successful q(1)*, q(2)*, ..., and q(M)* as $w_{q(1)*}(i,j) \cdot w_{q(2)*}(i,j) \cdot \ldots \cdot w_{q(M)*}(i,j)$, while using $w_{q(m)*}(i,j)=1$ for all i and j for any q(m) set to "not found", to obtain a calculated reconstructed watermarking plane for i ranging from 1 to I, and j ranging from 1 to J.

24. A method as recited in claim 23, further comprising confirming an existence of the calculated composite watermarking plane in the image by successfully detecting the calculated reconstructed watermarking plane.

25. A method as recited in claim 19, wherein at least one watermark is subliminally invisible.

26. An article of manufacture comprising a computer usable medium having computer readable program code means embodied therein for causing watermarking, the computer readable program code means in said article of manufacture comprising computer readable program code means for causing a computer to effect the steps of claim 1.

27. A computer program product comprising a computer usable medium having computer readable program code means embodied therein for causing watermarking, the computer readable program code means in said computer program product comprising computer readable program code means for causing a computer to effect the steps of claim 1.

28. A program storage device readable by machine, tangibly embodying a program of instructions executable by the machine to perform method steps for watermarking, said method steps comprising the steps of claim 20.

29. A method comprising imparting a plurality of watermarks onto a digital image including the steps of:

imparting a first watermark onto a monochrome plane, said monochrome plane having pixels with one-to-one pixel correspondence with pixels of said digital image and with said pixels of said monochrome plane initially having uniform pixel brightness values, said pixels of said monochrome plane forming a first watermarking image;

imparting at least one other watermark upon said first watermarking image forming another watermarking image;

linearly remapping pixel brightness values of said another watermarking image such that all brightness values 'bv' lie in a range $0 \leq bv \leq 1$, forming a composite watermarking plane; and imparting said plurality of watermarks from said composite watermarking plane into said digital image.

30. A method as recited in claim 29, wherein a step of imparting said plurality of watermarks includes watermarks obtained by multiplying pixel brightness value of each pixel in said digital image by a linearly remapped brightness value of a corresponding pixel in said watermarking plane.

31. An article of manufacture comprising a computer usable medium having computer readable program code means embodied therein for causing watermarking, the computer readable program code means in said article of manufacture comprising computer readable program code means for causing a computer to effect the steps of claim 29.

32. An article of manufacture comprising a computer usable medium having computer readable program code means embodied therein for causing watermarking, the computer readable program code means in said article of manufacture comprising computer readable program code means for causing a computer to effect the steps of claim 30.

33. An article of manufacture comprising a computer usable medium having computer readable program code means embodied therein for causing watermarking, the computer readable program code means in said article of manufacture comprising computer readable program code means for causing a computer to effect the steps of claim 31.

34. A computer program product comprising a computer usable medium having computer readable program code means embodied therein for causing watermarking, the computer readable program code means in said computer program product comprising computer readable program code means for causing a computer to effect the steps of claim 29.

35. A program storage device readable by machine, tangibly embodying a program of instructions executable by the machine to perform method steps for watermarking, said method steps comprising the steps of claim 29.

36. A method as recited in claim 1, further comprising forming an element of a composite watermarking plane as the product of a first watermarking element chosen from a distinct watermarking plane from a single group of distinct watermarking planes, with at least one other watermarking element chosen from at least one other distinct watermarking plane chosen from the same group.

37. A method comprising:
 obtaining a monochrome plane having monochrome pixels with one-to-one correspondence with image pixels of a digital image, said monochrome pixels having uniform brightness values;
 imparting a first watermark onto said monochrome plane in forming a first watermarked plane;
 imparting at least one other watermark onto said first watermarked plane in forming another watermarked plane;
 linearly remapping the brightness values of said monochrome pixels such that all brightness values 'bv' lie in a range $0 \leq bv \leq 1$; and
 forming a composite watermarking plane.

38. A method as recited in claim 37, further comprising imparting the composite watermarking plane onto a digital image, said digital image having a plurality of image pixels, each image pixel having one-to-one position correspondence with a monochrome pixel of said composite watermarking plane.

39. A program storage device readable by machine, tangibly embodying a program of instructions executable by the machine to perform method steps for watermarking, said method steps comprising the steps of claim 37.

40. A method as recited in claim 4, wherein a cluster of up to 1 million unique composite watermarking planes is formed by using distinct combinations of:
 a first distinct watermark plane taken from a first group of up to one hundred distinct watermarking planes;
 a second distinct watermarking plane taken from a second group of up to one hundred distinct watermarking planes; and
 a third distinct watermarking plane taken from a third group of up to one hundred distinct watermarking planes.

41. A method comprising detecting at least one distinct watermark from a composite watermark imparted into a digitized image:
 obtaining said digitized image into which said composite watermark was imparted employing a particular watermarking process, wherein each watermark in each plane of said digitized image has an array having one-to-one correspondence between a watermark array and a pixel position array of the image; and
 employing detection steps associated with a detection technique for a watermark imparted using said particular watermarking process.

42. A method comprising detecting a composite watermark imparted into a digitized image copy employing a watermarking process, including the steps of:
 recalling a plurality of groups of watermarking parameters saved during the watermarking process;
 choosing a previously first unused set of watermarking parameters from a first group of watermarking parameter sets;
 reconstructing a first distinct watermarking plane using said first unused set from the first group watermarking parameter sets in forming a reconstructed first distinct watermarking plane;
 attempting detection of the reconstructed first distinct watermarking plane in the selected image copy;
 saving an index of the first unused set, q*, of watermarking parameters from the first unused set if the detection is successful, otherwise repeating the steps of choosing, reconstructing and attempting until all sets of watermarking parameters from the first group of ten sets are used, otherwise setting q* to "not found" to reflect no detection if the detection using any watermarking parameter set of watermarking parameters from the first group is not successful;
 choosing a second unused set of watermarking parameters from a second group of watermarking parameter sets;
 reconstructing a second distinct watermarking plane, $w_{r^*}(i,j)$, using said second unused set of watermarking parameters from the second group of watermarking parameter sets;
 attempting detection of the reconstructed second distinct watermarking plane in the selected image copy;
 saving an index of the set, r*, of watermarking parameters from said a second unused set if the detection is successful, otherwise repeating the steps of choosing, reconstructing and attempting until all still unused sets of watermarking parameters from the second group of watermarking parameter sets are used, otherwise setting r* to "not found" to reflect no detection if the detection using all sets of watermarking parameters from the second group is not successful;
 choosing a third unused set of "robust-watermarking-parameters" from a third group of watermarking parameter sets;
 reconstructing a third distinct watermarking plane, $w_{s^*}(i,j)$, using the third unused set of watermarking parameters from the third group of watermarking parameter sets;
 attempting detection of the reconstructed third distinct watermarking plane in the selected image copy; and
 saving an index of the set, s*, of watermarking parameters from the third unused set if the detection is successful, otherwise repeating the steps of choosing, reconstructing and attempting until all of watermarking parameter sets from the third group of watermarking parameter sets are used, otherwise setting s* to "not found" to reflect no detection if the detection using any set of watermarking parameters from the third group is not successful.

43. An article of manufacture comprising a computer usable medium having computer readable program code means embodied therein for causing watermarking, the computer readable program code means in said article of manufacture comprising computer readable program code means for causing a computer to effect the steps of claim 40.

44. A computer program product comprising a computer usable medium having computer readable program code means embodied therein for causing watermarking, the computer readable program code means in said computer program product comprising computer readable program code means for causing a computer to effect the steps of claim 40.

45. An article of manufacture comprising a computer usable medium having computer readable program code means embodied therein for causing watermarking, the computer readable program code means in said article of manufacture comprising computer readable program code means for causing a computer to effect the steps of claim 41.

46. A computer program product comprising a computer usable medium having computer readable program code means embodied therein for causing watermarking, the computer readable program code means in said computer program product comprising computer readable program code means for causing a computer to effect the steps of claim 41.

47. A program storage device readable by machine, tangibly embodying a program of instructions executable by the machine to perform method steps for watermarking, said method steps comprising the steps of claim 41.

48. An article of manufacture comprising a computer usable medium having computer readable program code means embodied therein for causing watermarking, the computer readable program code means in said article of manufacture comprising computer readable program code means for causing a computer to effect the steps of claim 42.

49. A computer program product comprising a computer usable medium having computer readable program code means embodied therein for causing watermarking, the computer readable program code means in said computer program product comprising computer readable program code means for causing a computer to effect the steps of claim 42.

50. A program storage device readable by machine, tangibly embodying a program of instructions executable by the machine to perform method steps for watermarking, said method steps comprising the steps of claim 42.

* * * * *